United States Patent Office 2,884,458
Patented Apr. 28, 1959

2,884,458

PROCESS FOR PREPARING PARA-FLUOROANILINE

Delmer A. Fidler, Niagara Falls, N.Y., assignor to Olin Mathieson Chemical Corporation, a corporation of Virginia No Drawing. Application March 15, 1957
Serial No. 646,211

7 Claims. (Cl. 260—580)

This invention relates to a method for the preparation of para-fluoroaniline and, more particularly, to the preparation of para-fluoroaniline by the catalytic hydrogenation of nitrobenzene.

Para-fluoroaniline is a well known compound having the formula $FC_6H_4NH_2$. It is a clear oil which is very slightly soluble in water. The compound has a specific gravity of 1.173 at 20° C./4° C. It melts at −0.8° C. and boils at 187° C. at an absolute pressure of 753 mm. of mercury.

Weinmayr, J.A.C.S. 77, 1762 (1954), states that only aniline and traces of para-aminophenol are obtained when nitrobenzene alone is hydrogenated in hydrogen fluoride. In accordance with the present invention, however, it has been discovered that good yields of para-fluoroaniline can be produced by hydrogenating nitrobenzene with molecular hydrogen when the nitrobenzene is in admixture with a relatively large amount of hydrogen fluoride and when a platinum oxide, palladium oxide or palladium metal is used as a hydrogenation catalyst. The molar ratio of hydrogen fluoride to nitrobenzene introduced into the reaction system can be varied within the range from 10:1 to 50:1, the preferable molar ratio being approximately 35:1. The temperature at which the reaction is conducted can be varied widely, generally being from 0° C. to 150° C., and preferably being from 40° C. to 75° C.

As has been stated, the catalyst can be platinum oxide, palladium oxide or palladium metal. Platinum oxide is the preferred catalyst, with palladium oxide being somewhat less effective for the desired purpose. Where palladium metal is utilized as the catalyst, it is suitably supported on carbon and, if desired, chromium oxide can also be supported on the carbon along with the palladium. Likewise, where palladium oxide is utilized as the catalyst, it can also be supported on carbon, if desired. The concentration of the catalyst will generally be within the range from 0.05 weight percent to 5 weight percent, based upon the weight of active catalytic material (platinum oxide, palladium oxide or palladium metal) present in the catalyst, the preferred concentration being approximately 1 weight percent. In this connection, the concentration of catalyst is based upon the weight of nitrobenzene introduced into the reaction system. The reaction pressure utilized can be varied widely, generally being within the range from atmospheric pressure to 1,000 p.s.i.g. and likewise the reaction time can be varied widely, generally being within the range from 0.25 hour to 10 hours. Preferably the catalytic hydrogenation of the nitrobenzene is conducted in apparatus constructed of Monel or ordinary carbon steel. The reaction should be performed in the absence of water, since the presence of water increases the yield of aniline and this is undesirable. After the hydrogenation has been carried out to produce the para-fluoroaniline product, the product can be separated from the reaction mixture using conventional means, such as precise distillation, extractive distillation or azeotropic distillation using water to form an azeotrope with aniline by-product and thereby aid in its separation from the para-fluoroaniline.

The following examples illustrate in detail various embodiments falling within the scope of this invention:

EXAMPLE I

This experiment was conducted in a micro Monel pressure vessel or autoclave. Into the autoclave, cooled in Dry Ice, there was placed 25 grams (0.20 mole) of nitrobenzene, 0.25 gram of platinum oxide ($PtO_2$) catalyst in the form of powder and 140 grams (7.0 moles) of anhydrous hydrogen fluoride. The autoclave was sealed, purged with nitrogen, agitated and heated to 50° C. Hydrogen then was introduced at a constant rate and at a pressure of 55 p.s.i.g. until there was no further hydrogen uptake. The amount of hydrogen absorbed was measured by the pressure differential on a one liter storage cylinder. During the hydrogenation the temperature of the reaction increased and cooling (water at 25° C.) was occasionally necessary to maintain the temperature at 50° C. Slightly greater than the stoichiometric two moles of hydrogen was found necessary for an optimum yield.

As soon as the hydrogen uptake ceased, the autoclave was cooled by immersion in cold water at 15° C. The reaction mixture then was poured into a polyethylene beaker. The product coming directly from the autoclave was colorless but immediately became blue upon exposure to air due to the oxidation of phenolic side products. The reaction product was made alkaline with 25 weight percent aqueous caustic soda and steam distilled. Four liters of steam distillate were collected, saturated with sodium chloride and extracted three times with diethyl ether using approximately 200 ml. of ether. The ethereal extracts were combined, dried over magnesium sulfate, and then concentrated by evaporation under vacuum. After removal of the ether, the distillation was continued to give a liquid mixture of approximately 5 weight percent aniline and 95 weight percent para-fluoroaniline. The aniline was removed by an azeotropic distillation using water as an entrainer for the aniline. The platinum oxide catalyst was recovered, washed with water, then diethyl ether, and dried in a vacuum oven at 65° C. for three hours. The catalyst was then used in subsequent experiments.

In this experiment, 16.0 grams of liquid was obtained. A 100 percent conversion of the nitrobenzene was obtained with a yield of 12.6 percent aniline and 61.0 percent yield of para-fluoroaniline. This yield and conversion are based on an infrared analysis of the product obtained.

EXAMPLE II

The catalytic hydrogenation of nitrobenzene in the presence of anhydrous hydrogen fluoride in a single pass flow system will also produce para-fluoroaniline.

In this experiment the catalyst used was 230 ml. of 0.5 weight percent platinum, in the form of platinum oxide, on 4 to 8 mesh carbon. A bed approximately ¾ inch in diameter and 18 inches in length was employed. In a typical experiment, 50 grams (0.41 mole) of nitrobenzene and 150 grams (8.5 moles) of anhydrous hydrogen fluoride were placed in the reactor containing the aforementioned catalyst bed. The system was purged with both nitrogen and hydrogen and the mixture of nitrobenzene and hydrogen fluoride was circulated through the catalyst bed in a trickle tower arrangement. The rate of circulation of the reaction mixture was about 20 ml. per minute. The catalyst bed was heated to 48° C. and the hydrogen introduced counter-currently for 1.3 hours, at a constant pressure of 100 p.s.i.g. above that of the partial pressure of the reactants. An infrared analysis of the product obtained from this reaction indicated a conversion of the starting nitrobenzene of 92 percent. A yield of 39 percent aniline and 15 percent fluoroaniline was obtained. The aniline was removed from the reaction mixture by precise distillation.

EXAMPLE III

This experiment was performed in the same manner and in the same apparatus as Example I.

Into the autoclave, cooled in Dry Ice, there was placed 50 grams (0.41 mol) of nitrobenzene, 0.50 gram platinum oxide catalyst powder and 140 grams (7.0 moles) of anhydrous hydrogen fluoride. The autoclave was sealed, purged with nitrogen, agitated and heated to 50° C. Hydrogen then was introduced at a constant rate and at a pressure of 200 p.s.i.g. until there was no further hydrogen uptake. After the reaction had been completed, the reaction mixture was treated in the same manner as in Example I. Most of the catalyst, 0.44 gram, was recovered, washed with water, then with diethyl ether and dried for 3 to 4 hours in a vacuum oven at 60° C. In this run 15.6 grams of liquid distillate (essentially aniline and para-fluoroaniline) was obtained. A 100 percent conversion of the nitrobenzene was obtained with a yield of 21.2 percent para-fluoroaniline and 8.2 percent yield of aniline. This yield and conversion are based on an infrared analysis of the product obtained. The aniline was separated from the para-fluoroaniline by precise fractionation.

In the second part of this experiment, 50 grams (0.41 mole) of nitrobenzene, 0.43 gram of catalyst recovered from the previous run, and 140 grams (7.0 moles) of anhydrous hydrogen fluoride were charged to the reactor. The reaction was performed in the same apparatus and in the same manner as in Example I. The reactor was heated to 50° C. and pressured to 200 p.s.i.g. with hydrogen gas. At the completion of the reaction, the product was treated in the same maner as in Example I. The reaction product weighed 25.4 grams. A 100 percent conversion of the nitrobenzene was obtained with a yield of 43.5 percent para-fluoroaniline and 14.8 percent yield of aniline. This yield and conversion are based on an infrared analysis of the product obtained. The aniline was separated from the para-fluoroaniline by precise distillation. The yield of liquid distillate (essentially aniline and para-fluoroaniline) increased to 43.5 percent from 21.2 percent and the yield of aniline increased to 14.8 percent from 8.2 percent.

Tables I and II set forth the operating conditions and results obtained when nitrobenzene is catalytically hydrogenated in accordance with the general procedures described above.

Table I

| Example | Nitro-Benzene, Gms. | $PtO_2$ Cat., Gms. | Pressure, P.s.i.g. | Temp., °C. | Gms. Liquid | Percent Yield, p-$FPhNH_2$ | Percent Yield, $PhNH_2$ | Percent Conv., $PhNO_2$ |
|---|---|---|---|---|---|---|---|---|
| IV | 50 | 0.5 | 500 | 120 | 7.0 | 28.1 | 7.7 | 100 |
| V | 50 | 0.5 | 750 | 120 | 8.61 | 13.4 | trace | 100 |
| VI | 50 | 0.5 | 200 | 50 | 17.2 | 35.5 | 9.0 | 100 |
| VII | 50 | 0.5 | 300 | 120 | 10.5 | 18.2 | 4.1 | 100 |
| VIII | 25 | 0.25 | 200 | 50 | 10.5 | 37.5 | 8.2 | 100 |
| IX | 50 | 0.5 | 200 | 50 | 22.2 | 37.4 | 14.5 | 100 |
| X | 50 | 0.05 | 200 | 50 | 29.5 | 27.0 | ? | 62 |
| XI | 50 | 0.5 | 50 | 50 | 25.0 | 42.1 | 11.5 | 100 |
| XII | 50 | 0.1 | 50 | 50 | 26.1 | 46.8 | 12.0 | 100 |
| XIII | 50 | 0.5 | 55 | 30 | 29.6 | 43.4 | trace | 82.2 |
| XIV | 25 | 0.25 | 55 | 50 | 28.0 | 42.5 | 23.9 | 100 |
| XV | 25 | 0.25 | 55 | 50 | 16.0 | 61.0 | 12.6 | 100 |
| XVI | | | | | 15.2 | 58.8 | 12.0 | 100 |

These experiments were conducted in a micro Monel pressure vessel; 140 grams of anhydrous HF were present in each example.

Table II

| Example | Nitro-Benzene, Gms. | Catalyst, Gms. | Pressure, P.s.i.g. | Temp., °C. | Gms. Liquid | Percent Yield, p-$FPhNH_2$ | Percent Yield, $PhNH_2$ | Percent Conv., $PhNO_2$ |
|---|---|---|---|---|---|---|---|---|
| XVII | 50 | 0.5 g. PdO | 50 | 50 | 25.0 | 32.3 | 26.3 | 100 |
| XVIII | 50 | 20 g. 0.5 weight percent $PtO_2$/C | 55 | 50 | 23.6 | 16.9 | 23.5 | 79.0 |
| XIX | 50 | 1 g. 5 weight percent Pd/C | 50 | 50 | 28.9 | 21.1 | 34.4 | 77.0 |
| XX | 50 | 2 g. 5 weight percent Pd/C | 150 | 80 | 28.8 | 37.2 | 30.2 | 100 |
| XXI | 50 | 2 g. 5 weight percent Pd/C (Powdered) | 150 | 80 | 28.3 | 28.6 | 37.2 | 100 |
| XXII | 50 | 20 g. 0.5 weight percent Pd/C (Granular) | 150 | 80 | 20.8 | 24.6 | 20.1 | 95 |
| XXIII | 50 | 2 g. 5 weight percent Pd/C (Powdered) | 250 | 80 | 28.0 | 25.2 | 44.0 | 100 |

These experiments were conducted in a micro Monel pressure vessel; 140 grams of anhydrous HF were present in each experiment.

Para-fluoroaniline can be used to prepare para-fluorophenol, which in turn can be used to prepare the fungicide 2,2'-dihydroxy-5,5'-difluorobiphenyl sulfide.

Thus, in order to prepare para-fluorophenol from para-fluoroaniline, 0.086 gram mole of para-fluoroanililine is added to 0.3 gram mole of stirred concentrated sulfuric acid. The mixture is then added concurrently with 0.116 gram mole of sodium nitrite in 1.5 gram moles of water to 0.26 gram mole of concentrated sulfuric acid diluted with approximately 10 grams of shaved ice. While maintaining the temperature at 4–12° C., the para-fluoroaniline hydrosulfate (formed from the para-fluoroaniline and sulfuric acid) is kept in excess until all of it is added. After twenty minutes, the diazotization is complete and the excess nitrous acid is decomposed with urea.

In a three-necked flask fitted with a distillation apparatus, dropping funnel, thermometer and steam inlet tube, there is placed 1.32 gram moles of water, 0.46 gram mole of concentrated sulfuric acid and 0.06 gram mole of copper sulfate. This solution is heated to 145–180° C. by means of a heating mantle. Steam then is passed into the solution and the diazonium mixture added dropwise. The reaction is conducted for 2.8 hours. After the addition of the diazonium mixture is completed, the steam distillate is washed with aqueous sodium bicarbonate solution and extracted with diethyl ether. The ethereal extracts are combined, dried over magnesium sulfate and the ether evaporated. The residue is crude para-fluorophenol. A 70 percent yield of crude para-fluorophenol, 75 percent pure, is obtained in this manner and the para-fluorophenol is further purified by repeated recrystallization from solution in ethanol.

Para-fluorophenol can be converted to 2,2'-dihydroxy- 5,5'-difluorobiphenyl sulfide in the following manner: To 124 grams of para-fluorophenol dissolved in one liter of anhydrous carbon disulfide, 102 grams of freshly prepared sulfur dichloride is added in four hours with stirring at room temperature. Hydrogen chloride gas is evolved. The mixture is heated at refluxing temperature overnight. After pouring over ice, 68 grams of pure produce as an orange precipitate is obtained, and the filtrate gives a dark residue after removal of the carbon disulfide by steam. The residue upon pouring into ice gives 38 grams more of product, thus resulting in a crude yield of 106 grams or 41 percent. Recrystallization from ethylene dichloride gives white needles, and vacuum sublimation gives the pure compound 2,2'-dihydroxy-5,5'-difluorobiphenyl sulfide having a melting point of 119° C.

Cotton thread impregnated with a 1000 p.p.m. solution of 2,2'-dihydroxy-5,5'-difluorobiphenyl sulfide in petroleum ether is protected against fungus damage. Note PB 111592, "Chemical Investigations of Fluorine Compounds as Fungicides," published by the Office of Technical Services, U.S. Department of Commerce.

I claim:

1. A method for the manufacture of para-fluoroaniline which comprises hydrogenating nitrobenzene with molecular hydrogen at a temperature within the range from 0° C. to 150° C. and at a pressure within the range from 0 p.s.i.g. to 1000 p.s.i.g. while the reaction mixture contains from 10 to 50 moles of hydrogen fluoride per mole of nitrobenzene and also contains a hydrogenation catalyst selected from the group consisting of platinum oxide, palladium oxide and palladium metal.

2. The method of claim 1 wherein the hydrogenation catalyst is platinum oxide.

3. The method of claim 1 wherein the hydrogenation catalyst is palladium oxide.

4. The method of claim 1 wherein the hydrogenation catalyst is palladium metal.

5. A method for the manufacture of para-fluoroaniline which comprises hydrogenating nitrobenzene with molecular hydrogen at a temperature within the range from 40° C. to 75° C. and at a pressure within the range from 0 p.s.i.g. to 1000 p.s.i.g. while the reaction mixture contains from 10 to 50 moles of hydrogen fluoride per mole of nitrobenzene and also contains from 0.05 to 5 percent by weight, based upon the weight of the nitrobenzene, of platinum oxide as a hydrogenation catalyst.

6. A method for the manufacture of para-fluoroaniline which comprises hydrogenating nitrobenzene with molecular hydrogen at a temperature within the range from 40° C. to 75° C. and at a pressure within the range from 0 p.s.i.g. to 1000 p.s.i.g. while the reaction mixture contains from 10 to 50 moles of hydrogen fluoride per mole of nitrobenzene and also contains from 0.05 to 5 percent by weight, based upon the weight of the nitrobenzene, of palladium oxide as a hydrogenation catalyst.

7. A method for the manufacture of para-fluoroaniline which comprises hydrogenating nitrobenzene with molecular hydrogen at a temperature within the range from 40° C. to 75° C and at a pressure within the range from 0 p.s.i.g. to 1000 p.s.i.g. while the reaction mixture contains from 10 to 50 moles of hydrogen fluoride per mole of nitrobenzene and also contains from 0.05 to 5 percent by weight, based upon the weight of the nitrobenzene, of palladium metal as a hydrogenation catalyst.

References Cited in the file of this patent
UNITED STATES PATENTS 2,683,745    Emerson et al. _____ July 13, 1954

OTHER REFERENCES

Blanksma: Rec. Trav. Chim. 25, 365-75 (1906).